(12) United States Patent
Nataniel et al.

(10) Patent No.: US 7,160,979 B2
(45) Date of Patent: *Jan. 9, 2007

(54) POLYAMIDES

(75) Inventors: Tina Nataniel, Saint Charles, IL (US); Dwight Heinrich, Aurora, IL (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/973,145

(22) Filed: Oct. 25, 2004

(65) Prior Publication Data

US 2005/0165211 A1    Jul. 28, 2005

Related U.S. Application Data

(60) Provisional application No. 60/524,532, filed on Nov. 24, 2003.

(51) Int. Cl.
*C08G 69/26* (2006.01)

(52) U.S. Cl. .................. 528/339.3; 528/324; 528/314; 528/345

(58) Field of Classification Search ............... 528/339.3
See application file for complete search history.

(56) References Cited

U.S. PATENT DOCUMENTS

| | | | |
|---|---|---|---|
| 3,499,853 A | 3/1970 | Griebsch et al. | |
| 3,565,837 A | 2/1971 | Drawert et al. | |
| 3,847,875 A | 11/1974 | Drawert et al. | |
| 4,062,820 A | 12/1977 | Mitchell, III et al. | |
| 4,122,229 A | 10/1978 | Mitchell et al. | |
| 4,218,351 A | 8/1980 | Rasmussen | |
| 4,282,346 A | 8/1981 | Sharkey et al. | |
| 4,409,373 A | 10/1983 | Wiemers et al. | |
| 4,663,371 A | 5/1987 | Arnold et al. | |
| 4,729,567 A | 3/1988 | Oka et al. | |
| 4,760,125 A | 7/1988 | Wiemers et al. | |
| 4,777,238 A * | 10/1988 | Leoni et al. | 528/339.3 |
| 4,791,164 A | 12/1988 | Wichelhaus et al. | |
| 4,810,772 A | 3/1989 | Leoni et al. | |
| 4,853,460 A | 8/1989 | Harman | |
| 4,882,414 A | 11/1989 | Wroczynski | |
| 4,912,196 A | 3/1990 | Leoni et al. | |
| 4,914,162 A | 4/1990 | Leoni et al. | |
| 5,138,027 A | 8/1992 | Van Beek | |
| 5,548,027 A | 8/1996 | Heucher et al. | |
| 5,719,255 A | 2/1998 | Heucher et al. | |
| 5,723,538 A | 3/1998 | Fischer et al. | |
| 5,804,682 A | 9/1998 | Fischer et al. | |
| 5,807,968 A | 9/1998 | Heinrich et al. | |
| 5,883,172 A | 3/1999 | Heucher et al. | |
| 5,886,135 A | 3/1999 | Fischer et al. | |
| 5,922,831 A | 7/1999 | Heinrich et al. | |
| 5,948,880 A | 9/1999 | Fischer et al. | |
| 6,670,442 B1 | 12/2003 | Rossini et al. | |

FOREIGN PATENT DOCUMENTS

| | | |
|---|---|---|
| EP | 0 334 667 | 9/1989 |
| EP | 1 454 957 | 9/2004 |
| GB | 1319807 | 9/1970 |
| WO | WO 03/046078 | 6/2003 |

* cited by examiner

*Primary Examiner*—Patricia Hightower
(74) *Attorney, Agent, or Firm*—Stephen D. Harper

(57) ABSTRACT

The reaction of dimer acids, $C_6$ to $C_{18}$ aliphatic dicarboxylic acids, dimer amines, alkylene diamines having from 2 to 8 carbon atoms, and polyoxyalkylene diamines provides polyamides having excellent cold flexibility, high heat resistance, and low moisture absorbency (low water vapor transmission).

20 Claims, No Drawings

POLYAMIDES

CROSS-REFERENCE TO RELATED APPLICATIONS

This application claims priority from U.S. Provisional Application Ser. No. 60/524,532, filed 24 Nov. 2003 and incorporated herein by reference in its entirety.

FIELD OF THE INVENTION

The invention relates to polyamides based on dimer acids, $C_6$ to $C_{18}$ aliphatic dicarboxylic acids, dimer amines, alkylene diamines having from 2 to 8 carbon atoms, and polyoxyalkylene diamines.

SUMMARY OF THE INVENTION

The present invention provides polyamides having an exceptionally desirable combination of properties, including excellent cold flexibility, high heat resistance, and low moisture absorbency (low water vapor transmission). The polyamides are formed by reacting a) an acid component comprising at least one dimerized $C_{12}$ to $C_{24}$ unsaturated fatty acid (dimer acid) and at least one $C_6$ to $C_{18}$ aliphatic dicarboxylic acid and b) an amine component comprising at least one alkylene diamine having from 2 to 8 carbon atoms, at least one $C_{24}$ to $C_{48}$ dimer amine, and at least one polyoxyalkylene diamine. The polyamides of the invention are particularly useful for molding applications in the cable and electronic industry.

DETAILED DESCRIPTION OF CERTAIN EMBODIMENTS OF THE INVENTION

The acid component used to prepare the polyamides of the present invention contains one or more dimerized $C_{12}$ to $C_{24}$ unsaturated fatty acids. Incorporating such dimerized fatty acids into the polyamide has been found to reduce the water transmission rate while also allowing good low temperature flexibility to be maintained. Normally, altering the structure of a polyamide to decrease the polyamide's susceptibility to moisture compromises the flexibility of the polyamide at lower temperatures. Suitable dimer acids may be produced by combining or condensing two moles of unsaturated monocarboxylic acid (the monocarboxylic acid molecules which react may be the same or different). Processes for the production of dimer acids are well known to the art and by way of illustration, reference may be had to U.S. Pat. Nos. 2,793,219 and 2,955,121. Thirty-six carbon ($C_{36}$) dimer acids obtained by the dimerization of an unsaturated $C_{18}$ acid such as oleic acid, linoleic acid, linolenic acid and mixtures thereof (e.g., tall oil fatty acids) are especially useful and advantageously employed for the preparation of the polyamides. Such dimer acids have as their principal component a $C_{36}$ dicarboxylic acid and typically have an acid value in the range 180–215, saponification value in the range 190–205 and neutral equivalent from 265–310. Dimer acids containing less than 30% by weight by-product acids including monobasic acids, trimer acids or higher polymer acids are especially useful for this invention. The dimer acids may also be hydrogenated prior to use and/or molecularly distilled or otherwise purified to increase the dimer content to 90% or more.

The preferred starting acids for the preparation of the dimerized fatty acids used in this invention are oleic and linoleic acids, due to their ready availability and relative ease of polymerization. Mixtures of oleic and linoleic acids are found in tall oil fatty acids, which are a convenient commercial source of these acids. Fatty acids can be dimerized using various well known catalytic and noncatalytic polymerization methods. A typical composition of the dimerized $C_{18}$ tall oil fatty acids which may be used as starting materials for the polyamides of the present invention is:

| | |
|---|---|
| $C_{18}$ monobasic acids (monomer) | 0–15% by wt. |
| $C_{36}$ dibasic acids (dimer) | 60–96% by wt. |
| $C_{54}$ (or higher) trimer acid or polybasic acids | 0.2–35% by wt. |

In preparing the polyamides of the the present invention, the starting dimerized unsaturated fatty acid in one embodiment contain as high a percentage as possible of the dimer (dibasic) acid, e.g., at least about 90% by weight.

The acid component additionally contains one or more aliphatic dicarboxylic acids containing from 6 to 18 (in one embodiment, 9 to 14) carbon atoms. Linear as well as branched aliphatic dicarboxylic acids may be employed. Suitable aliphatic dicarboxylic acids for use in the present invention include, but are not limited to, compounds corresponding to the general formula HOOC—$R_1$—COOH where $R_1$ is a divalent, aliphatic, hydrocarbon radical having from 4 to 16 (in one embodiment, 7 to 12) carbon atoms such as azelaic acid, sebacic acid, dodecanedicarboxylic acid, and mixtures thereof. $R_1$ may be straight chain or branched. In one embodiment of the invention, sebacic acid is one of the $C_6$ to $C_{18}$ aliphatic dicarboxylic acids or the only such dicarboxylic acid used in the acid component. In one embodiment, sebacic acid may comprise at least 50 mole % (in another embodiment, at least 80 mole %; in yet another embodiment, at least 90 mole %) of the aliphatic dicarboxylic acid(s) used.

The equivalent ratio of dimerized unsaturated fatty acids to aliphatic dicarboxylic acids in one embodiment is from about 1:0.7 to about 1:1.7, in another embodiment from about 1:1 to about 1:1.4. In certain embodiments of the invention, the dimerized unsaturated acid(s) and aliphatic dicarboxylic acid(s) together comprise at least 50 mole % (in another embodiment, at least 80 mole %; in yet another embodiment, at least 95 mole %) of the acid component.

The amine component is comprised of at least one alkylene diamine having from 2 to 8 carbon atoms, at least one $C_{24}$ to $C_{48}$ dimer amine, and at least one polyoxyalkylene diamine. Other types of amines may optionally also be present in the amine component. However, the aforementioned three specific types of amines in one embodiment together comprise at least 50 mole % (in another embodiment, at least 80 mole %; in yet another embodiment, at least 95 mole %) of the amine component. In still another embodiment, the amine component consists essentially of one or more alkylene diamines having from 2 to 8 carbon atoms, one or more $C_{24}$ to $C_{48}$ dimer amines, and one or more polyoxyalkylene diamines.

The alkylene diamine in one embodiment corresponds to the formula:

$$H_2N—(CHR)_n—NH_2$$

where "n" is 2 to 8 (in one embodiment, 2 to 4), and R is hydrogen or lower (e.g., $C_1$–$C_4$) alkyl. The R groups within a single molecule may be the same or different. Straight chain alkylene diamines (where all R groups are H) are used in one embodiment of the invention, although branched chain alkylene diamines (where at least one R is an alkyl group) could also be used (either alone or in combination with one or more straight chain alkylene diamines). Thus, illustrative non-limiting examples of useful alkylene diamines include ethylenediamine, 1,2-propylenediamine, 1,3-propylenediamine, tetramethylenediamine, pentamethylenediamine, hexamethylenediamine, octamethylenediamine, 2-methyl-1,5-pentanediamine, 5-methyl-1,9-nonanediamine, and trimethylhexamethylenediamine and mixtures thereof. Especially useful polyamides are obtained in accordance with this invention when the alkylene diamine used is predominately (e.g., greater than 50 mole %; in another embodiment greater than 80 mole %) or entirely ethylenediamine.

One or more $C_{24}$ to $C_{48}$ dimer amines (sometimes referred to as dimer diamines) are additionally present in the amine component used to prepare the polyamide. Such materials are similar in composition and structure to the dimerized fatty acids discussed hereinabove in connection with the acid component, but contain primary amino groups instead of carboxylic acid groups. They may be obtained, for example, by conversion of the carboxylic acid groups in dimerized fatty acids to nitrile groups and subsequent hydrogenation. Suitable dimer amines are available commercially under the trade name "Versamine" from Cognis Corporation and under the trade name "Kemamine" from Crompton Corporation. In one embodiment, the dimer amines are prepared from $C_{12}$ to $C_{24}$ (in another embodiment, $C_{16}$ to $C_{20}$; in yet another embodiment, $C_{18}$) unsaturated fatty acids, such as oleic acid, linoleic acid, linolenic acid, or mixtures thereof (such as mixtures of fatty acids derived from tall oil).

The amine component is further comprised of one or more polyoxyalkylenediamines. The polyoxyalkylenediamine reactant helps to impart good low temperature flexibility to the polyamide and may comprise one or more amino-compounds where the amino-compound comprises both amine groups and a polyether chain.

Illustrative non-limiting examples of useful polyoxyalkylenediamines have the structural formula:

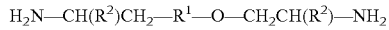

$H_2N$—$CH(R^2)CH_2$—$R^1$—$O$—$CH_2CH(R^2)$—$NH_2$ wherein:

$R^1$ represents a polyoxyalkylene chain having the structural formula:

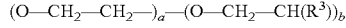

(O—$CH_2$—$CH_2$—)$_a$—(O—$CH_2$—$CH(R^3)$)$_b$ wherein:
$R^3$ is a monovalent organic radical selected from the group consisting of C1 to C4 aliphatic hydrocarbons, 'a' designates a number of ethoxy groups (O—$CH_2$—$CH_2$), 'b' designates a number of monosubstituted ethoxy groups (O—$CH_2$—$CH(R^3)$), the sum of 'a' and 'b' is equal to or greater than 1 but less than or equal to 300, provided that for any values of a and b the sequence of ethoxy and monosubstituted ethoxy groups within a polyoxyalkylene chain may be completely random and/or there may be blocks of ethoxy and/or monosubstituted ethoxy groups, and $R^2$ designates hydrogen or a monovalent organic radical selected from the group consisting of C1 to C4 aliphatic hydrocarbons.

Techniques for preparing suitable polyoxyalkylenediamines are known in the art, and include reacting an initiator containing two hydroxyl groups with ethylene oxide and/or monosubstituted ethylene oxide (e.g., propylene oxide) followed by conversion of the resulting terminal hydroxyl groups to amines. Illustrative of the polyoxyalkylenediamine reactants employed in the invention are the Jeffamine™ brand of polyoxyalkyleneamines available from Huntsman Corporation, Houston, Tex. These polyoxyalkylenediamines are prepared from reactions of bifunctional initiators with ethylene oxide and propylene oxide followed by conversion of terminal hydroxyl groups to amines. Especially suitable polyoxyalkyleneamines include the Jeffamine™ D-series polyoxyalkyleneamines from Huntsman Chemical Company. The polyoxyalkylenediamines utilized in the present invention may, for example have number average molecular weights between about 460 and about 6,000, in another embodiment having number average molecular weights from about 600 to about 5,000. In one embodiment, the polyoxyalkylenediamines contain only oxypropylene groups, i.e., those polyoxyalkylenediamines of the above formula wherein "a" is zero and $R^3$ is methyl.

The equivalent ratio of $C_2$–$C_8$ alkylene diamine to dimer amine is in one embodiment from about 1:0.5 to about 1:1.2, in another embodiment from about 1:0.7 to about 1:1. The equivalent ratios of $C_2$–$C_8$ alkylene diamine to polyoxyalkylene diamine and dimer amine to polyoxyalkylene diamine are in one embodiment each from about 1:0.01 to about 1:0.1, in another embodiment from about 1:0.02 to about 1:0.06.

In one embodiment, the moieties in the polyamide which are derived from the dimerized fatty acid(s) and the dimer amine(s) together represent from 35 to 55 mole percent of the total moieties in the polyamide. In one other embodiment, the moieties in the polyamide which are derived from the $C_2$–$C_8$ alkylene diamine and the $C_6$ to $C_{18}$ aliphatic dicarboxylic acids together represent from 45 to 65 mole percent of the total moieties in the polyamide. The moieties in the polyamide which are derived from the polyoxyalkylene diamine in one embodiment represent from 0.1 to 2 mole percent of the total moieties in the polyamide.

The number of free acid groups and/or free amine groups present in the polyamide are directly related to the relative amounts of the acid component and amine component involved in the polymerization reaction and the degree of completion of the reaction. The polyamide may be either acid-terminated, amine-terminated, or contain both acid and amine terminal groups. Generally speaking, polyamides in accordance with the invention that are acid-terminated tend to have better stability at elevated temperatures than the corresponding amine-terminated polyamides. However, the amine-terminated polyamides tend to exhibit better adhesion to substrate surfaces. Approximately stoichiometric amounts (e.g., a ratio of total acid to total amine groups of from about 0.9:1 to about 1.1:1, more typically from about 0.97:1 to about 1.03:1) based on the total number of available acid and amine groups may be used to prepare the polyamide resins of this invention and the reaction conditions can be selected to ensure completion or substantial completion of the amidation (condensation) reaction.

In one embodiment of the invention, the polyamide may be the result of as complete an amidation reaction as possible between the starting acid component and the amine component. Those skilled in the art will recognize that the degree of completion of the amidation process can be determined by evaluating the acid number and the amine number of the final polymer. The polyamide may have relatively low acid and amine numbers, typically less than about 40 in total, more typically less than about 15 in total, and even more typically less than about 10 in total.

The instant polyamides may be prepared using conventional procedures and reaction conditions known to the art. It should be noted that while reference is made to acid and amine components for purposes of determining the relative amounts of each acid and amine used to prepare the polyamide, there is no need to form a separate premix of acids and a separate premix of amines, nor is it required that all reactants be charged together at the beginning of the reaction. In general, the acid and amine components may be reacted until the final product has an acid value and an amine value less than 15 (in another embodiment, less than 10), with the reaction being generally conducted at temperatures from about 100° C. to about 300° C. for from about 1 to about 8 hours. Most often the reactions will be heated from 140° to 240° C. until the theoretical amount of water is evolved. Generally several hours are required to complete the reaction. The reaction is preferably conducted under an inert atmosphere, such as nitrogen, and during the final stages of the reaction a vacuum is applied to the system to facilitate removal of the final traces of water and any other volatile materials. The use of acid catalysts, such as phosphoric acid, and vacuum can be used, especially in the latter part of the reaction, to yield a more complete amidation reaction.

The polyamides obtained by the aforedescribed procedures may be used without further modification. The polyamide compositions of this invention may, however, be combined or modified with conventional additives widely known and used in the resin arts. For example, thermal stabilizers, antioxidants, UV stabilizers, plasticizers, nucleating agents, impact modifiers, tackifiers, flame retardants, antistatic agents, reinforcing agents, processing aids including mold release agents, lubricants and the like, as well as pigments, dyes, inorganic or organic fillers such as carbon black, talc, clay, mica and the like may usefully be included.

Polyamides of the present invention exhibit desirable high temperature properties, together with melting and thermal degradation temperatures making them well suited for melt processing and fabricating in injection molding and extrusion operations. A variety of articles such as machine parts and electric and electronic component parts may be formed by conventional molding methods such as compression molding, injection molding, extrusion, overmolding and other thermoforming operations. For example the composition of this invention can be used to make electrical connectors such as surface mount connectors, insulation for wire and cable, electrical film and tape, switches, circuit breakers, electrical connectors, fuse holders, fuses, relays, terminal blocks, and switch gear, as well as articles such as pump housings, and under-the-hood automobile applications. The polyamides described herein are particularly useful in the production of electrical components comprising a resin portion surrounding or in contact with an electrically conductive element (e.g., a metal pick-up) where moisture transmission through the resin portion may cause corrosion of the electrically conductive element. The polyamides of the present invention are thus useful for purposes of encapsulating and protecting electronic components such as sensors which are to be exposed to water. Other applications include insert molding of electronic components and circuit boards, molded grommets and connectors, sealing of multi-wire connectors, sealing of microswitches, sealing of PC boards, and the like.

EXAMPLE

A polyamide in accordance with the invention is prepared by reacting the following materials:

| | |
|---|---|
| $C_{36}$ Dimer Acid[1] | 37.23 parts by weight |
| Sebacic Acid | 15.65 parts by weight |
| Ethylene Diamine | 4.56 parts by weight |
| $C_{36}$ Dimer Amine[2] | 34.85 parts by weight |
| Polyoxyalkylene Diamine[3] | 5.69 parts by weight |
| Octamine (Antioxidant) | 2.00 parts by weight |
| Phosphoric Acid | 0.020 parts by weight |

[1]VERSAMID 288 (68.4P), equivalent weight 282, obtained from Cognis Corporation
[2]VERSAMINE 551, equivalent weight 272, obtained from Cognis Corporation
[3]JEFFAMINE D-2000, equivalent weight 1000, obtained from Huntsman Chemical The blended materials are heated for 90 minutes under nitrogen at 227 degrees C. and then for an additional 60 minutes under vacuum at the same temperature to obtain the polyamide. The polyamide has a water vapor transmission (WVT) rate of 0.03 g/hm$^2$ (as measured by ASTM E 96-00 Water Method), a glass transition temperature of −40 degrees C. (as measured by DSC), and a temperature creep resistance of 160 degrees C. (as measured by shear adhesion failure temperature; 3 lbs load, 1 degree C./min). If the dimer amine is replaced by piperazine, the water vapor transmission rate increases significantly. If the sebacic acid is omitted, the temperature creep resistance decreases significantly. If the polyoxyalkylene diamine is omitted, the glass transition temperature increases significantly.

What is claimed is:

1. A polyamide which is the reaction product of a) an acid component comprising at least one dimerized $C_{12}$ to $C_{24}$ unsaturated fatty acid and at least one $C_6$ to $C_{18}$ aliphatic dicarboxylic acid and b) an amine component comprising at least one alkylene diamine having from 2 to 8 carbon atoms, at least one $C_{24}$ to $C_{48}$ dimer amine, and at least one polyoxyalkylene diamine.

2. A polyamide according to claim 1 wherein the acid component comprises at least one dimerized $C_{16}$ to $C_{20}$ unsaturated fatty acid.

3. A polyamide according to claim 1 wherein the at least one dimerized $C_{12}$ to $C_{24}$ unsaturated fatty acid is prepared using one or more fatty acids selected from the group consisting of oleic acid, linoleic acid, linolenic acid, and mixtures thereof.

4. A polyamide according to claim 1 wherein the acid component comprises at least one dimerized $C_{18}$ unsaturated fatty acid.

5. A polyamide according to claim 1 wherein the acid component comprises at least one $C_9$ to $C_{14}$ aliphatic dicarboxylic acid.

6. A polyamide according to claim 1 wherein the acid component comprises sebacic acid.

7. A polyamide according to claim 1 wherein the amine component comprises at least one alkylene diamine having from 2 to 4 carbon atoms.

8. A polyamide according to claim 1 wherein the amine component comprises ethylenediamine.

9. A polyamide according to claim 1 wherein the amine component comprises at least one $C_{32}$ to $C_{40}$ dimer amine.

10. A polyamide according to claim 1 wherein the amine component comprises at least one $C_{36}$ dimer amine.

11. A polyamide according to claim 1 wherein the amine component comprises at least one polyoxyalkylene diamine prepared by polymerizing one or more $C_2$ to $C_4$ epoxides to form a polyether polyol having hydroxyl end-groups and converting the hydroxyl end-groups to amine groups.

12. A polyamide according to claim 1 wherein the moieties in the polyamide which are derived from the $C_2$–$C_8$ alkylene diamines and the $C_6$ to $C_{18}$ aliphatic dicarboxylic acids together represent from 45 to 65 mole percent of the total moieties in the polyamide.

13. A polyamide according to claim 1 wherein the moieties in the polyamide which are derived from the polyoxyalkylene diamine preferably represent from 0.1 to 2 mole percent of the total moieties in the polyamide.

14. A polyamide according to claim 1 wherein the equivalent ratio of $C_2$–$C_8$ alkylene diamine to dimer amine is from about 1:0.5 to about 1:1.2.

15. A polyamide according to claim 1 wherein the moieties in the polyamide which are derived from the dimerized fatty acids and the dimer amines together represent from 35 to 55 mole percent of the total moieties in the polyamide.

16. A polyamide according to claim 1 wherein the equivalent ratio of $C_2$–$C_8$ alkylene diamine to polyoxyalkylene diamine is from about 1:0.01 to about 1:0.1.

17. A polyamide according to claim 1 wherein the equivalent ratio of dimer amine to polyoxyalkylene diamine is from about 1:0.01 to about 1:0.1.

18. A polyamide according to claim 1 wherein the equivalent ratio of dimerized unsaturated fatty acids to aliphatic dicarboxylic acids is from about 1:0.7 to about 1:1.7.

19. A polyamide which is the reaction product of a) an acid component comprising at least one dimerized $C_{16}$ to $C_{20}$ unsaturated fatty acid and at least one $C_9$ to $C_{14}$ aliphatic dicarboxylic acid and b) an amine component comprising at least one alkylene diamine having from 2 to 4 carbon atoms, at least one $C_{32}$ to $C_{40}$ dimer amine, and at least one polyoxyalkylene diamine comprising oxypropylene moieties and having a number average molecular weight of at least about 460, wherein the equivalent ratio of alkylene diamine to dimer amine is from about 1:0.5 to about 1:1.2, the equivalent ratio of alkylene diamine to polyoxyalkylene diamine is from about 1:0.01 to about 1:0.1, the equivalent ratio of dimer amine to polyoxyalkylene diamine is from about 1:0.01 to about 1:0.1, and the equivalent ratio of dimerized $C_{16}$ to $C_{20}$ unsaturated fatty acid to $C_9$ to $C_{14}$ aliphatic dicarboxylic acid is from about 1:0.7 to about 1:1.7.

20. A polyamide which is the reaction product of a) an acid component comprising at least one dimerized $C_{18}$ unsaturated fatty acid and at least one aliphatic dicarboxylic acid selected from the group consisting of azelaic acid, sebacic acid, and dodecanedicarboxylic acid and b) an amine component comprising ethylene diamine, at least one $C_{36}$ dimer amine, and at least one polyoxypropylene diamine having a number average molecular weight of at least about 460, wherein the equivalent ratio of ethylene diamine to $C_{36}$ dimer amine is from about 1:0.7 to about 1:1, the equivalent ratio of $C_{36}$ dimer amine to polyoxypropylene diamine is from about 1:0.02 to about 1:0.06, the equivalent ratio of ethylene diamine to polyoxypropylene diamine is from about 1:0.02 to about 1:0.06, and the equivalent ratio of dimerized $C_{18}$ unsaturated fatty acids to aliphatic dicarboxylic acids is from about 1:1 to about 1:1.4, the moieties in the polyamide which are derived from the ethylene diamine and the aliphatic dicarboxylic acids together represent from 45 to 65 mole percent of the total moieties in the polyamide, the moieties in the polyamide which are derived from the $C_{36}$ dimer amine and the dimerized $C_{18}$ unsaturated fatty acids together represent from 35 to 55 mole percent of the total moieties in the polyamide, and the moieties in the polyamide which are derived from the polyoxypropylene diamine preferably represent from 0.1 to 2 mole percent of the total moieties in the polyamide.

\* \* \* \* \*